Patented Feb. 13, 1923.

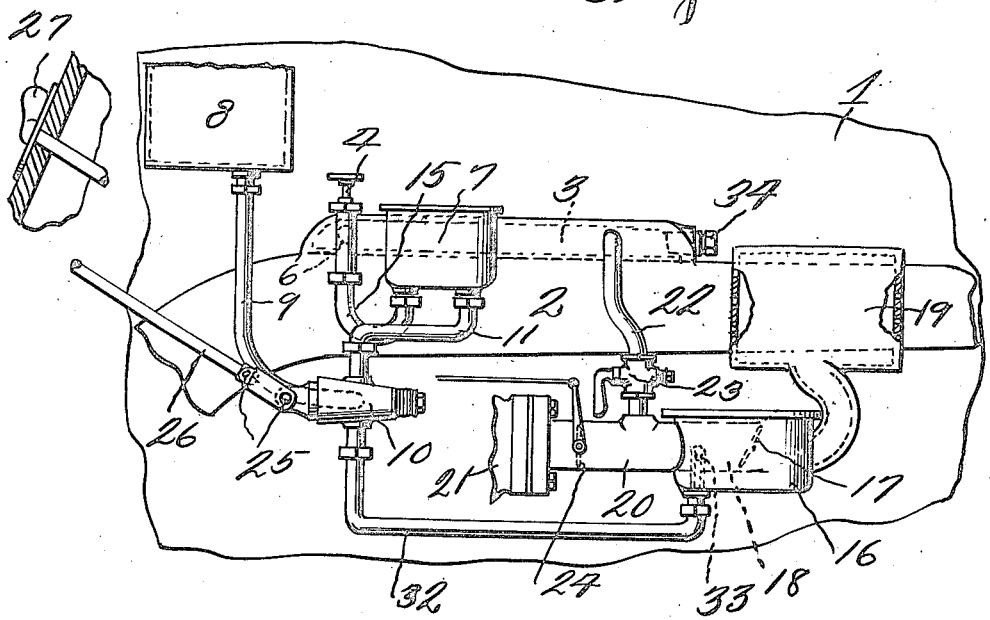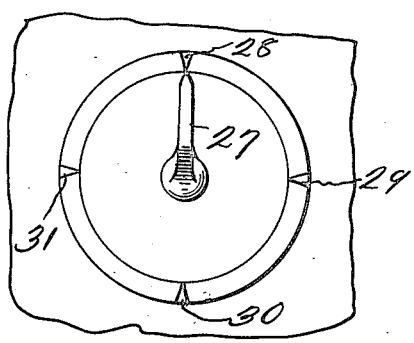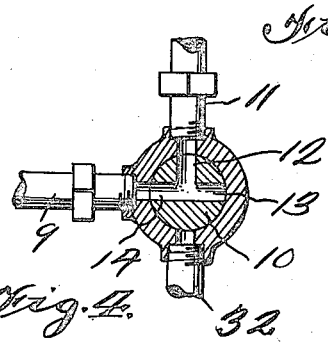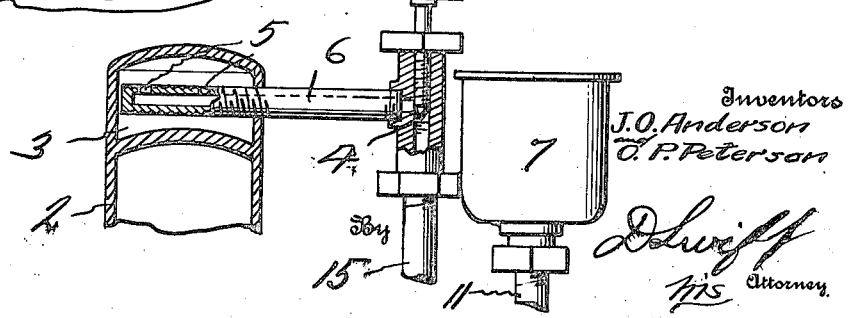

1,445,194

UNITED STATES PATENT OFFICE.

JOHN OSCAR ANDERSON AND OSCAR PETER PETERSON, OF ELY, MINNESOTA.

CHARGE PREHEATING AND VAPORIZING DEVICE.

Application filed June 24, 1921. Serial No. 480,166.

*To all whom it may concern:*

Be it known that we, JOHN OSCAR ANDERSON and OSCAR PETER PETERSON, citizens of the United States, residing at Ely, in the county of St. Louis, State of Minnesota, have invented a new and useful Charge Preheating and Vaporizing Device; and we do hereby declare the following to be a full, clear, and exact description of the invention, such as will enable others skilled in the art to which it appertains to make and use the same.

The invention relates to charge vaporizing and preheating devices for internal combustion engines and has for its object to provide a device of this character wherein liquid in sprayed form on the intake impulses of the piston will be sucked into a generating casing formed integrally with the exhaust manifold, thence through a valved pipe connection with the air supply pipe of a carbureter where it is thoroughly mixed with air and sucked through the intake manifold to the combustion chambers of the cylinders, said mixing of air and vaporizing of the charge volatilizing the charge and securing the maximum power therefrom.

A further object is to provide means whereby the amount of fuel vaporized and the amount of air mixed with the vaporized fuel may be regulated and controlled.

A further object is to provide means whereby the generating chamber may be cleaned when desired.

A further object is to provide means whereby the charge will be thorough vaporized and mixed with air before entering the combustion chamber of the engine and preheated, thereby insuring quick ignition, maximum efficiency from the fuel and consequently reducing the formation of carbon within the cylinders to a minimum.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a portion of conventional form of internal combustion engine, showing the improved carbureter and preheating device applied thereto.

Figure 2 is a plan view of the dial and controlling knob disposed on the dash of the vehicle.

Figure 3 is a sectional view through the valve for controlling the supply of fuel.

Figure 4 is a sectional view through the needle supply valve and the generating chamber carried by the exhaust pipe.

Referring to the drawings, the numeral 1 designates a portion of an internal combustion engine and 2 the exhaust manifold thereof. Formed integrally with the exhaust maniold 2 is a generating chamber 3 into which liquids are sucked in the form of a spray through the needle valve 4 and apertures 5 of a nozzle 6, which nozzle is threaded through one wall of the chamber 3. The fuel in fluid form enters the float bowl 7 from the vacuum tank 8 through the pipe 9, valve 10 and pipe 11. Valve 10 is provided with ports 12, 13 and 14, and when the port 14 is in registration with the pipe 9, and the port 12 in registration with the pipe 11 as shown in figure 3, it will be seen that liquid may easily pass to the bowl 7, and from which bowl the liquid will be sucked through the pipe 15, the needle valve 4 and sprayed into the generating chamber 3, where it will be thoroughly heated and additionally vaporized and volatilized. Disposed adjacent the engine is a carbureter 16, in which carbureter is disposed an air throttle valve 17 or choker valve, which throttle valve is disposed in the mixing chamber 18 of the carbureter. During the suction stroke of the pistons, air will be sucked through the perforated jacket 19 carried by the exhaust pipe 2 and through the mixing chamber 18 of the carbureter thence through the pipe 20 leading to the intake manifold 21. At the same time the above operation is taking place vaporized gas is sucked through the pipe 22 from the generating chamber 3 into the pipe 20 where the same is thoroughly mixed with hot air, thereby additionally volatilizing the vapors so that they will be thoroughly consumed and ignited within the cylinders of the engine. The volume of flow of vaporized gases from the chamber 3 to the pipe 20 may be controlled by means of the valve 23, and the flow of mixed air and vaporized gases to the intake pipe 21 may be controlled and regulated by means of the throttle valve 24, which may be controlled from any portion of the vehicle desired.

The valve 10 has pivotally connected thereto at 25 a controlling rod 26, which controlling rod extends rearwardly and upwardly and terminates in a finger engaging right angularly disposed member 27 adapted to be positioned in registration with any of the graduations 28, 29, 30 or 31. When the valve 10 is in position shown in Figure 3, the member 27 registers with the mark 28 as indicated in Figure 2 and float bowl 7 is supplied from tank 8. The chamber 3 may be cleaned whenever desired by removing the plug 34.

When starting the engine when it is cold the valve in Fig. 3 must be in opposite position to that shown, and gasoline will be supplied to carburetor float bowl 16 and sucked through carburetor needle valve 33.

When it is desired to have a rich mixture the choker valve 17 can be used for that purpose when the engine is running on the carburetor, or on the vaporized gas.

The invention having been set forth what is claimed as new and useful is:—

A preheating and vaporizing device for internal combustion engines, said engine having an exhaust pipe and an intake pipe, said vaporizing device comprising a carbureter carried by the intake pipe, a pipe connection between the outer end of the carbureter and a perforated casing extending around the exhaust pipe, an auxiliary casing carried by the exhaust pipe and having a preheating chamber therein, a gasoline bowl adjacent the exhaust pipe and having a pipe connection with the preheating chamber, a three-way valve, a pipe connection between the three-way valve and a fuel supply tank, a pipe connection between the valve and the bowl, a pipe connection between the valve and the carbureter, a pipe connection between the intake manifold and the preheating chamber of the exhaust pipe and connected to the intake manifold between the carbureter and the engine, said three-way valve forming means whereby fuel may be fed to the bowl and carbureter simultaneously.

In testimony whereof we have signed our names to this specification in the presence of two subscribing witnesses.

JOHN OSCAR ANDERSON.
OSCAR PETER PETERSON.

Witnesses:
L. J. WHITE,
GERTRUDE CHIMZAR.